United States Patent [19]

Chiang

[11] Patent Number: 5,121,133

[45] Date of Patent: Jun. 9, 1992

[54] MARKING METHOD SHOWING A SEQUENCE OF SIDE-BY-SIDE CONDUCTORS IN SERIES FOR INFORMATION PURPOSES

[75] Inventor: Chin C. Chiang, Taipei, Taiwan

[73] Assignee: Hong Fu Electronics Co., Ltd., Taipei, Taiwan

[21] Appl. No.: 445,974

[22] Filed: Dec. 4, 1989

[51] Int. Cl.⁵ .................... G01D 15/18; B41F 17/00
[52] U.S. Cl. ........................... 346/1.1; 346/75; 346/140 R; 101/35
[58] Field of Search ............ 346/1.1, 75, 140 R; 101/35

[56] References Cited

U.S. PATENT DOCUMENTS

| | | | |
|---|---|---|---|
| 4,029,006 | 6/1977 | Mercer | 346/1.1 X |
| 4,503,437 | 3/1985 | Katzschner | 346/1.1 |
| 4,688,049 | 8/1987 | Doyle et al. | 346/1.1 |

*Primary Examiner*—Benjamin R. Fuller
*Assistant Examiner*—Gerald E. Preston
*Attorney, Agent, or Firm*—Brumbaugh, Graves, Donohue & Raymond

[57] ABSTRACT

A ribbon-type multi-conductor cable is fed beneath a source of ink drops while maintaining a predetermined orientation of the cable. Ink drops from the source are positioned along the moving cable so that a series of characters is printed on the broad side of the cable closer to one edge of the cable than the other edge. This off-center positioning allows each individual conductor in the cable to be identified by its position relative to the marking. In a second embodiment, the ink drops are positioned in the central area of a composite of two side-by-side connected ribbon-type cables so that two series of characters are simultaneously printed, one series on each of the two component cables parallel to each other but with opposite orientation. The composite cable is then cut lengthwise between the two series of characters resulting in two separately marked cables.

2 Claims, 2 Drawing Sheets

MARKING METHOD SHOWING A SEQUENCE OF SIDE-BY-SIDE CONDUCTORS IN SERIES FOR INFORMATION PURPOSES

BACKGROUND OF THE INVENTION

The present invention relates to an improvement for a new marking structure and method showing a sequence of side-by-side conductor in series for information purpose, particularly to a new marking structure and method showing a sequence of side-by-side conductor in series for information purpose which can print some symbols or characters free from any impact caused by the surface for printing so endurable that without any risk of coming-off, by means of an ink jet printer.

At nowadays, the side-by-side conductor has been widely applied to various advanced science and technology in the field of electronic industry such as telecommunication equipments, household appliances, computers' CPU and peripheral systems, tram parts, medical instruments, electrical wire and cable etc. Therefore, its consumption is quite enormous. The side-by-side conductor commonly used is characterized in that, a single conductor may contain tens of side-by-side electronic wires, whereby technical person may often fail to make sure of the sequence of electric wires in series during installation if no marking are made available on these side-by-side conductors. To avoid the confusion of the sequence of conductors, it is very common to coat one even layer of colored markings on one side of conductor during the process of production for assemblymen to distinguish, please refer to FIG. 1 showing a structure of markings of a conventional side-by-side conductor in series, wherein during the process of production, side-by-side conductor 1 is driven forward along two guide blocks 3 and 4 through a plane ink jet device 2 mounted at one end of said donductor 1. The side-by-side conductor 1 is printed by said ink jet device 2 during the course of forwarding to form a colored band at one side of said conductor 1, whereby this is provided for discernment purpose. However, accoring to such method, only one side of the side-by-side conductor 1 can be printed with ink to show the sequence in series. It will not be achieved for literatures relating to the functions or precautions of application to be printed on the upper and lower surface of said side-by-side conductor 1, such as applicable current, scope of application, model etc., as a result of rough surface for printing. Moreover, in the prior art of printing, ink is coated on the vertical surface at one side of side-by-side conductor and said side-by-side conductor itself is a soft and flexible products made of PVC. Owing to bending, floating upward, vertical surface of some conductors might not touch the ink jet printer during the process of printing, whereby colored bands of marking are thus interrupted. Furthermore, marking color(s) is coated on the margin at one side of conductor, whereby it is easily to be damaged by the other objects in respect of abrasion or scratch, thus, the user might not distinguish the arrangement order of conductor in series.

SUMMARY OF THE INVENTION

In view of aforesaid defects took place in the prior arts of conventional marking method showing the sequence of side-by-side conductor in series, the applicant thereby have invented a new structure and method of marking, showing the sequence of side-by-side conductor in series for information purpose by making efforts in research and accumulated experiences in this field.

An object of the present invention is to provide a new structure and method of marking, showing the sequence of side-by-side conductor in series for information purpose, which can print various kinds of literal symbols on a side-by-side conductor, whereby the user may discern relevant sequence in series as well as further realize what precautions to be noted for the use of side-by-side conductor according to the instructions shown thereon.

Another object of this new structure and method of marking, showing the sequence of side-by-side conductor in series for information purpose of the present invention is to spray ink in an extremely fine liquified bit manner onto the surface of side-by-side conductor by means of an ink jet printer, whereby all symbols, literal contents printed are in a spot-formed structure, whereby marking symbols will be evenly coated thereon even a rough surface of conductor and not come-off as a result of conductor having been bent for use.

A more complete understanding of these and other features and other advantages of the present invention will become apparent from a careful consideration of the following detailed description of certain embodiments illustrated in the accompanying drawings.

DETAILED DESCRIPTION OF THE PREFERRED EMBODIMENTS

Figure 1:
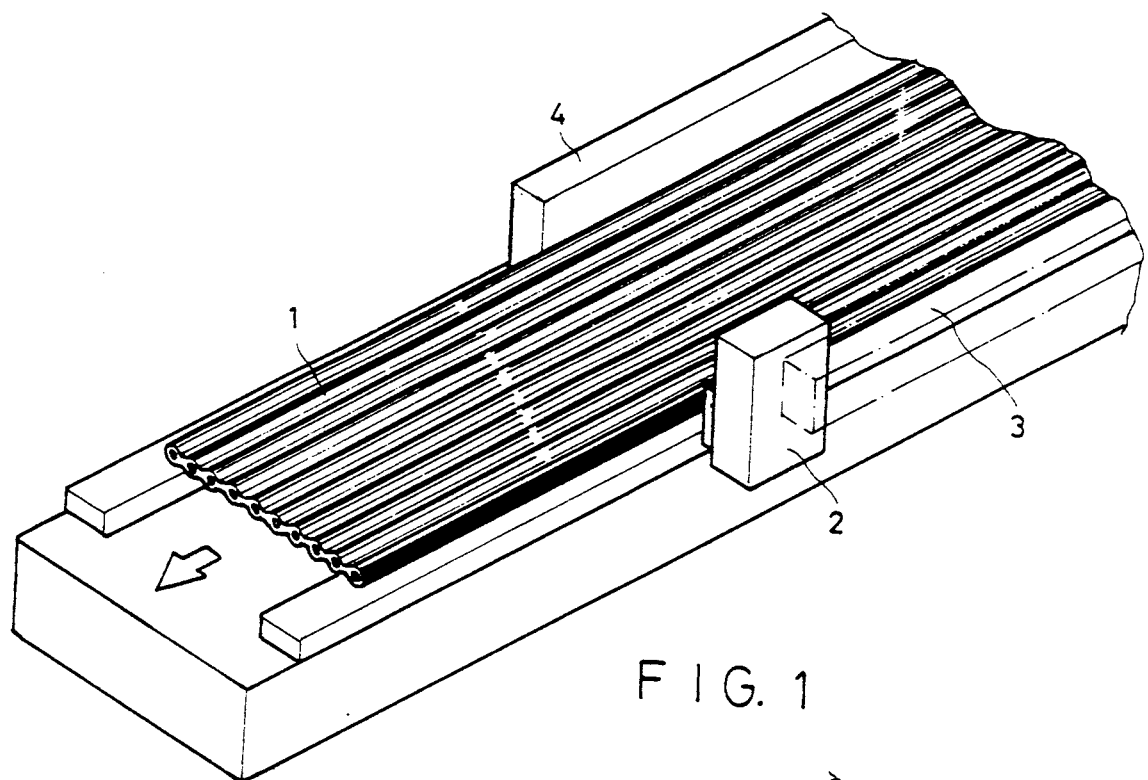
FIG. 1 shows a schematic diagram of one embodiment of prior arts in a conventional marking structure showing the sequence of side-by-side conductor in series.

Referring to FIG. 1, the prior arts in a conventional marking structure, showing the sequence of side-by-side conductor has been mentioned above.

Figure 2:
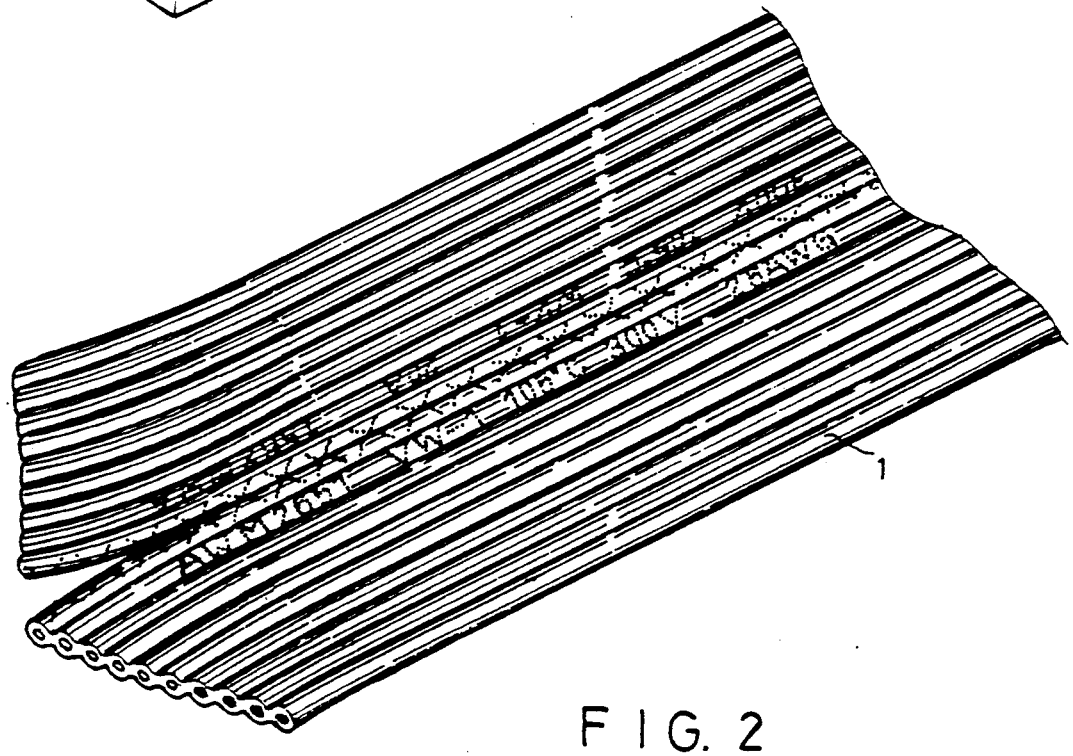
FIG. 2 shows a schematic diagram of marking structure of the present invention.

Referring to FIG. 2, there is disclosed a marking structure of the present invention, wherein symbols or characters desired to be printed have been directly printed on the surface at upper edge of side-by-side conductor 1 by means of fine bit-shaped ink so that it is different from that of prior arts in the conventional embodiment shown in FIG. 1., wherein ink is coated on one side of the vertical surface of side-by-side conductor and displacement of marking often takes place in the conventional embodiment as a result of conductor getting bent during the process of printing. Owing to such displacement occassioned, continuous marking symbols might be interrupted or uneven for printing. Moreover, such printing method is to coat ink on the surface of conductor by means of a plane contact, thus, it is solely applicable to printing regular and simple marking, and it is not applicable to rather complicated, multi-varied literal symbols. Furthermore, under the requirement of insulation and strength, side-by-side conductor shall be equipped with an cuter cover the thinner the better so as to have adequate flexibility for minimizing production cost. Therefore, the surface of most side-by-side conductors is made in a corrugated shape and very few has smooth surface. Thus it tends to be even more difficult for printing some descriptive instructions or symbols on such a rough surface as far as the way in the prior arts of said conventional embodiment. The present invention can meet this requirement completely and so it is a revolutionary invention.

Figure 3:
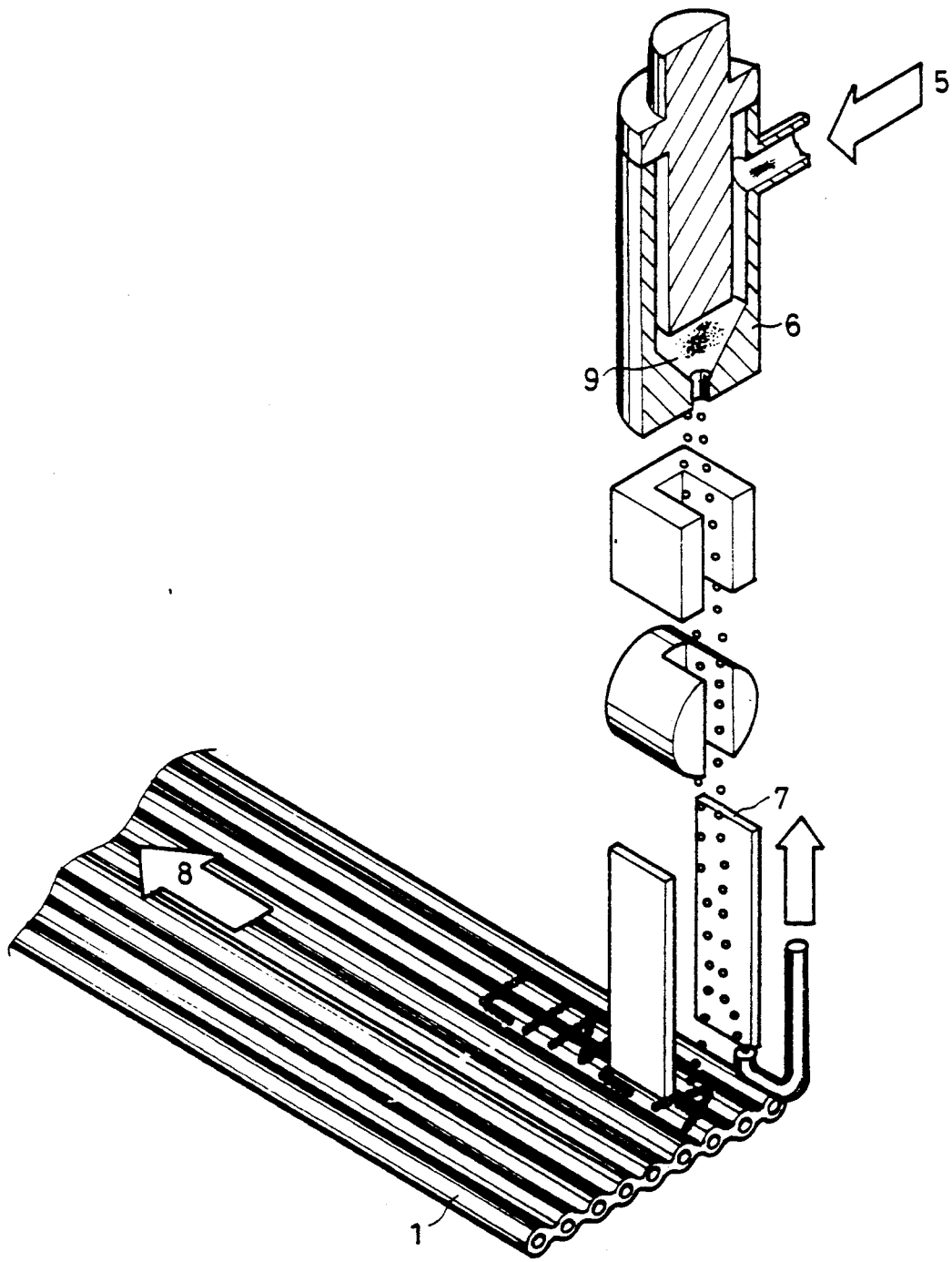
FIG. 3 shows a schematic diagram of marking method of one embodiment of the present invention.

Referring to FIG. 3, there is disclosed a preferred embodiment of marking of the present invention. The present invention is to print characters, symbols on the surface at upper edge of side-by-side conductor by means of an ink jet printer. In the illustrated embodiment, it is very easily to see the way of jet printing, wherein ink is led into the pressure room 9 along the direction of arrow 5 and then passes a nozzle jet 6, whereby ink is sprayed into separated drops. Once said ink drops have been passing a guider 7 in connection with a digital controller, under the control of singnals produced from said digital controller, ink drops can be printed on side-by-side conductor 1 in a bit shape accompanying with the shift of said guider 7. Side-by-side conductor 1 can be guided forward along the direction shown by an arrow 8 and the speed of guided movement is also controlled by said digital controller, whereby the speed of ink printing can match the speed of side-by-side conductor's movement. More specifically, because a digital controller can accept quite a great amount of informations such as various kinds of characters, special patterns which can be input from the terminal and converted into instructions by means of digital controller, whereby symbols or characters will be printed on the conductor evenly without any interruption, whereby relevant descriptions and precautions to side-by-side conductor such as scope of application, capacity of voltage, endurance of maximum temperature etc. are allowed to be marked thereon in details to be advantageous for the user in respect of convenience and safety. Furthermore, because printed characters or symbols comprise rather tiny spots which are spot-shaped ink printed on side-by-side conductor, they are allowed to printed on the convex-concave surface of side-by-side conductor clearly without any difficulty whatever flexible it may be for bending purpose. In addition, printed symbols for discernment will not come-off as a result of conductor having been bent for use.

Further referring to FIG. 2, in the preferred embodiment of the present invention, better marking is formed in the central area of side-by-side conductor 1, whereby marking showing the sequence of two side-by-side conductors in series can be obtained by a single process, unlike the prior art which discloses to obtain marking for one side-by-side conductor only by a single process. This is one of major characteristics in the present invention.

A new marking structure and method showing the sequence of side-by-side conductor in series for information prupose of the present invention not only can mark various kinds of complicated symbols or characters for discernment on the surface of conductor without any difficulty but also can print them on the rough surface of conductor, whereby it can mark relevant precautions and instructions to side-by-side conductor thereon to be advantageous for the user in respect of convenience and safety. Thus, the invention shall have a high utility.

I claim:

1. A method for marking information characters on a ribbon-type electrical cable comprising a plurality of conductors held in side-by-side relationship by a covering of insulation material, said method comprising the steps of:
   (a) feeding a ribbon-type multi-conductor cable in a first direction while maintaining a predetermined orientation so as to expose a broad side of said cable;
   (b) providing a source of ink drops capable of positioning a stream of ink drops in variable positions along a direction transverse to said first direction; and
   (c) controlling the positioning of said stream of ink drops along said transverse direction while said ribbon-type multi-conductor cable is fed in said first direction while maintaining said predetermined orientation so that a series of characters is printed on said broad side of said cable in an off-center position closer to one edge of said broad side than to the other edge of said broad side of said cable;
   whereby, the printing of said characters in said off-center position identifies one edge of the cable from the other edge, while the printing of said characters on said broad side of the cable avoids abrasion which may destroy legibility of edge printed characters.

2. A method for simultaneously marking information characters on two ribbon-type electrical cables, each comprising a plurality of conductors held in side-by-side relationship by a covering of insulation material, said method comprising the steps of:
   (a) feeding a composite of two side-by-side connected ribbon-type multi-conductor cables in a first direction while maintaining a predetermined orientation so as to expose a broad side of said side-by-side connected cables;
   (b) providing a source of ink drops capable of positioning a stream of ink drops in variable positions along a direction transverse to said first direction;
   (c) controlling the positioning of said stream of ink drops along said transverse direction while said side-by-side connected cables are fed in said first direction while maintaining said predetermined orientation so that two parallel series of characters are printed simultaneously, each of said series of characters being printed in an off-center position closer to one edge of the broad side of one of said side-by-side connected cables; and
   (d) separating said side-by-side connected cables between said two parallel series of characters to provide two separate ribbon-type multi-conductor cables, each marked by a series of characters in said off-center position;
   whereby, the printing of said characters in said off-center positions identifies one edge of each resultant cable from the other edge, while the printing of said characters on said broad side of each resultant cable avoids abrasion which may destroy legibility of edge printed characters.

* * * * *